United States Patent
Yano et al.

(10) Patent No.: US 8,786,677 B2
(45) Date of Patent: Jul. 22, 2014

(54) IMAGING DEVICE

(75) Inventors: Shuji Yano, Osaka (JP); Nakaba Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 13/196,838

(22) Filed: Aug. 2, 2011

(65) Prior Publication Data

US 2012/0033047 A1 Feb. 9, 2012

(30) Foreign Application Priority Data

Aug. 5, 2010 (JP) ................................. 2010-175960
Jul. 26, 2011 (JP) ................................. 2011-163524

(51) Int. Cl.
| | |
|---|---|
| H04N 13/02 | (2006.01) |
| H04N 5/232 | (2006.01) |
| H04N 5/357 | (2011.01) |
| G02B 27/64 | (2006.01) |
| G02B 7/10 | (2006.01) |

(52) U.S. Cl.
CPC ........... *H04N 5/357* (2013.01); *H04N 5/23258* (2013.01); *G02B 27/646* (2013.01); *H04N 5/2328* (2013.01); *G02B 7/102* (2013.01)
USPC ............. 348/46; 348/187; 348/607; 382/167; 382/276; 375/240.16

(58) Field of Classification Search
USPC .......................... 348/187, 607; 382/167, 276; 375/240.16
See application file for complete search history.

(56) References Cited

U.S. PATENT DOCUMENTS

| | | | | |
|---|---|---|---|---|
| 5,049,991 | A | * 9/1991 | Niihara | 375/240.16 |
| 5,629,988 | A | * 5/1997 | Burt et al. | 382/276 |
| 2006/0262974 | A1* | 11/2006 | Watanabe et al. | 382/167 |
| 2008/0252789 | A1* | 10/2008 | Sawa | 348/607 |
| 2011/0228102 | A1* | 9/2011 | Hashi et al. | 348/187 |

FOREIGN PATENT DOCUMENTS

JP 2001-136416 A 5/2001

* cited by examiner

*Primary Examiner* — Geepy Pe
(74) *Attorney, Agent, or Firm* — Shinjyu Global IP

(57) ABSTRACT

An imaging device is provided that comprises a movement detection component configured to detect movement of the imaging device based on a force imparted to the imaging device, an imaging component configured to produce image data by capturing a subject image, a movement vector detection component configured to detect a movement vector based on a plurality of sets of image data produced by the imaging component, and a three-dimensional NR component configured to reduce a noise included in first image data produced by the imaging component, based on second image data produced earlier than the first image data, wherein the three-dimensional NR component is configured to decide whether to correct the second image data in response to the detection result of the movement vector detection component, based on both the detection result of the movement detection component and the detection result of the movement vector detection component.

6 Claims, 9 Drawing Sheets

IMAGING DEVICE

CROSS-REFERENCE TO RELATED APPLICATIONS

This application claims priority to Japanese Patent Application No. 2010-175960 filed on Aug. 5, 2010 and Japanese Patent Application No. 2011-163524 filed on Jul. 26, 2011. The entire disclosure of Japanese Patent Application No. 2010-175960 and Japanese Patent Application No. 2011-163524 are hereby incorporated herein by reference.

BACKGROUND

1. Technical Field

The present invention relates to an imaging device, and more particularly relates to an imaging device with which a captured image can be subjected to three-dimensional NR processing.

2. Background Information

In Japanese Laid-Open Patent Application 2001-136416, there is disclosed a signal processing device. This signal processing device detects a movement vector from an input image signal. This signal processing device corrects the input image signal on the basis of the detected movement vector. This signal processing device corrects the noise included in a new input image signal on the basis of the corrected input image signal.

Consequently, this signal processing device can accurately extract the noise content, from which movement is excluded, from an inter-field or inter-frame difference signal.

SUMMARY

Nevertheless, with the signal processing device disclosed in the above-mentioned Patent Literature 1, movement is detected on the basis of a movement vector detected from an input signal. When movement detection is performed using a movement vector, it may be erroneously concluded that the imaging device has moved, even though it actually has not, if the subject moves, etc.

It is an object of the present invention to provide an imaging device with which erroneous operation is reduced in three-dimensional NR processing that takes into account the movement of the imaging device itself.

To solve the above-mentioned problem, the imaging device pertaining to the present invention comprises movement detection component configured to detect movement of the imaging device on the basis of force imparted to the imaging device, imaging component configured to produce image data by capturing a subject image, movement vector detection component configured to detect a movement vector on the basis of a plurality of sets of image data produced by the imaging component, and three-dimensional NR component configured to reduce a noise included in first image data produced by the imaging component, on the basis of second image data produced earlier than the first image data, wherein the three-dimensional NR component is configured to decide whether or not to correct the second image data in response to the detection result of the movement vector detection component, on the basis of both the detection result of the movement detection component and the detection result of the movement vector detection component.

The present invention makes it possible to provide an imaging device with which erroneous operation is reduced in three-dimensional NR processing that takes into account the movement of the imaging device itself.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiment 1

1-1. Configuration

Figure 1:
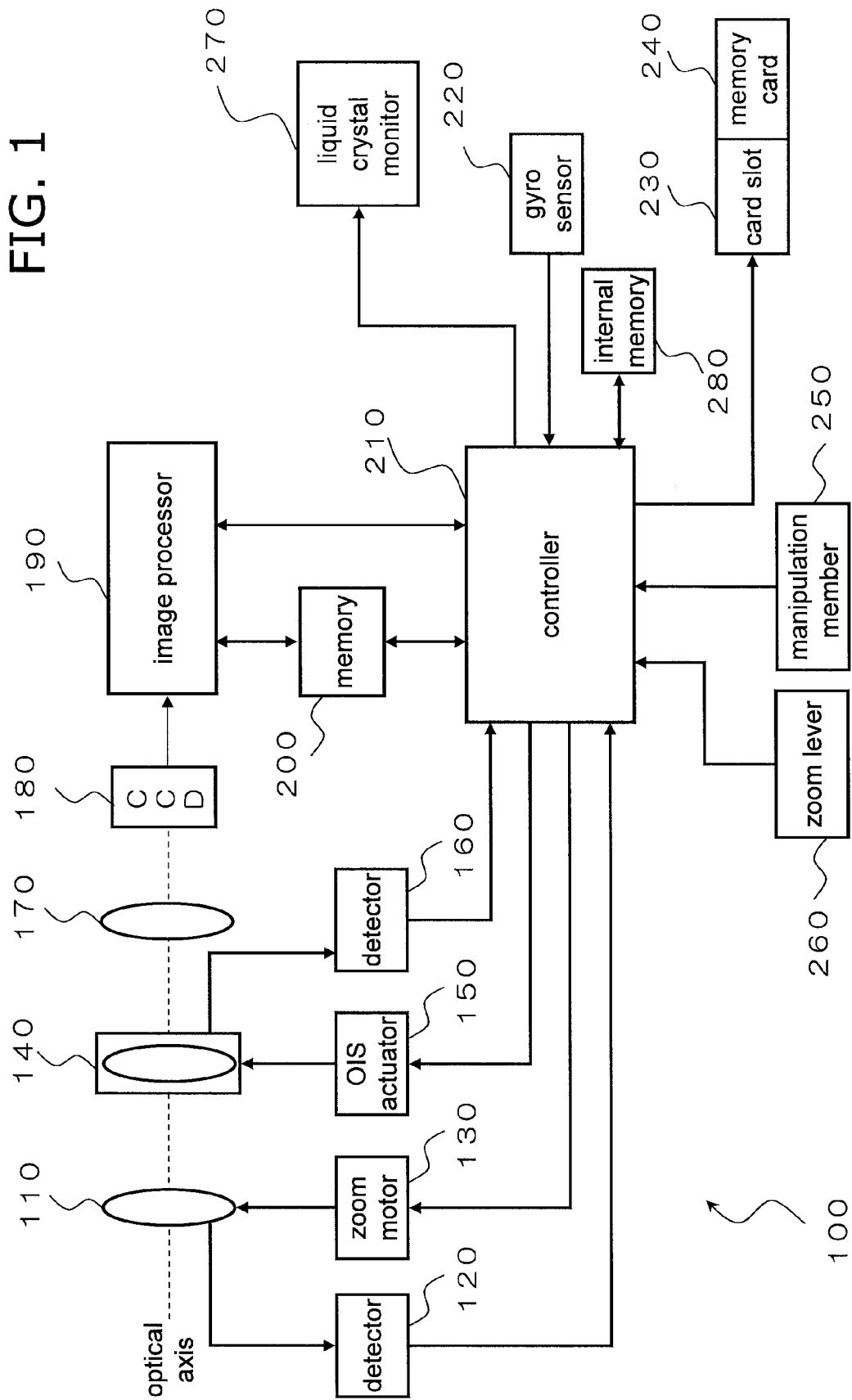
FIG. 1 is a block diagram of the configuration of a digital video camera 100 in Embodiment 1.

The electrical configuration of the digital video camera 100 pertaining to this embodiment will be described through reference to FIG. 1. FIG. 1 is a block diagram of the configuration of the digital video camera 100. The digital video camera 100 uses a CCD image sensor 180 to capture a subject image formed by an optical system composed of a zoom lens 110, etc. The image data produced by the CCD image sensor 180 is subjected to various kinds of processing by an image processor 190, and stored on a memory card 240. Image data stored on the memory card 240 can be displayed on a liquid crystal monitor 270. The configuration of the digital video camera 100 will now be described in detail.

The optical system of the digital video camera 100 includes the zoom lens 110, an OIS 140, and a focus lens 170. The zoom lens 110 moves along an optical axis of the optical system, allowing the subject image to be enlarged or reduced. The focus lens 170 also moves along the optical axis of the optical system, allowing the focus of the subject image to be adjusted.

The OIS 140 incorporates a correcting lens that can move in a plane that is perpendicular to the optical axis. The OIS 140 reduces blurring of the subject image by driving the correcting lens in a direction that cancels out shake of the digital video camera 100.

A zoom motor 130 drives the zoom lens 110. The zoom motor 130 may be a pulse motor, a DC motor, a linear motor, a servo motor, or the like. The zoom motor 130 may drive the zoom lens 110 via a mechanism such as a cam mechanism or a ball screw. A detector 120 detects the location of the zoom lens 110 on the optical axis. The detector 120 outputs a signal related to the position of the zoom lens by component of a brush or other such switch, according to the movement of the zoom lens 110 in the optical axis direction.

An OIS actuator 150 drives the correcting lens in the OIS 140 within the plane that is perpendicular to the optical axis. The OIS actuator 150 can be a flat coil, an ultrasonic motor, or the like. A detector 160 detects the amount of movement of the correcting lens within the OIS 140.

The CCD image sensor 180 produces image data by capturing the subject image formed by the optical system composed of the zoom lens 110, etc. The CCD image sensor 180 performs exposure, transfer, electronic shuttering, and various other operations. The CCD image sensor 180 is an example of the "imaging component" pertaining to this embodiment.

The image processor 190 subjects the image data produced by the CCD image sensor 180 to various kinds of processing. The image processor 190 subjects the image data produced by the CCD image sensor 180 to processing, producing image data for display on the liquid crystal monitor 270, or producing image data for storage on the memory card 240. For example, the image processor 190 subjects the image data produced by the CCD image sensor 180 to gamma correction, white balance correction, scratch correction, two-dimensional NR (noise reduction) that performs NR based on the spatial frequency of the image data, three-dimensional NR that performs NR based on the time direction difference or the like of the image data, electronic zoom that digitally enlarges an image signal, and various other kinds of processing. Also, the image processor 190 subjects the image data produced by the CCD image sensor 180 to detection of a movement vector that expresses the movement of the image as a whole. The image processor 190 also subjects the image data produced by the CCD image sensor 180 to compression in a format conforming to H. 264, MPEG2, or the like. The image processor 190 can be a DSP, a microprocessor, or the like. The image processor 190 is also an example of the "three-dimensional NR component," the "two-dimensional NR component," the "movement vector detection component," and the "electronic zoom component" pertaining to this embodiment.

A controller 210 is a control component for controlling the entire system. The controller 210 can be a semiconductor element or the like. The controller 210 may consist of hardware alone, or may be a combination of hardware and software. The controller 210 can be a microprocessor or the like.

A memory 200 functions as a working memory for the image processor 190 and the controller 210. The memory 200 can be a DRAM, a ferroelectric memory, or the like.

The liquid crystal monitor 270 can display an image indicated by the image data produced by the CCD image sensor 180, or an image indicated by image data read from the memory card 240.

A gyro sensor 220 consists of a piezoelectric element or other such vibrating member, etc. The gyro sensor 220 vibrates the piezoelectric element or other such vibrating member at a specific frequency while converting the Coriolis force into voltage, thereby obtaining angular velocity information. By obtaining angular velocity information from the gyro sensor 220 and driving the correcting lens in the OIS in the direction of canceling out the shake indicated by the angular velocity information, the digital video camera 100 avoids blurring of images due to hand movement. The gyro sensor 220 is an example of the "movement detection component" pertaining to this embodiment.

A card slot 230 removably supports the memory card 240. The card slot 230 allows mechanical and electrical connection with the memory card 240. The memory card 240 includes internally a flash memory, a ferroelectric memory, or the like, and can store data.

An internal 280 consists of consists of a flash memory, a ferroelectric memory, or the like. The internal 280 stores control programs and so forth for controlling the digital video camera 100 as a whole.

A manipulation member 250 is manipulated by the user. A zoom lever 260 is operated by the user to change the zoom ratio.

Figure 2:
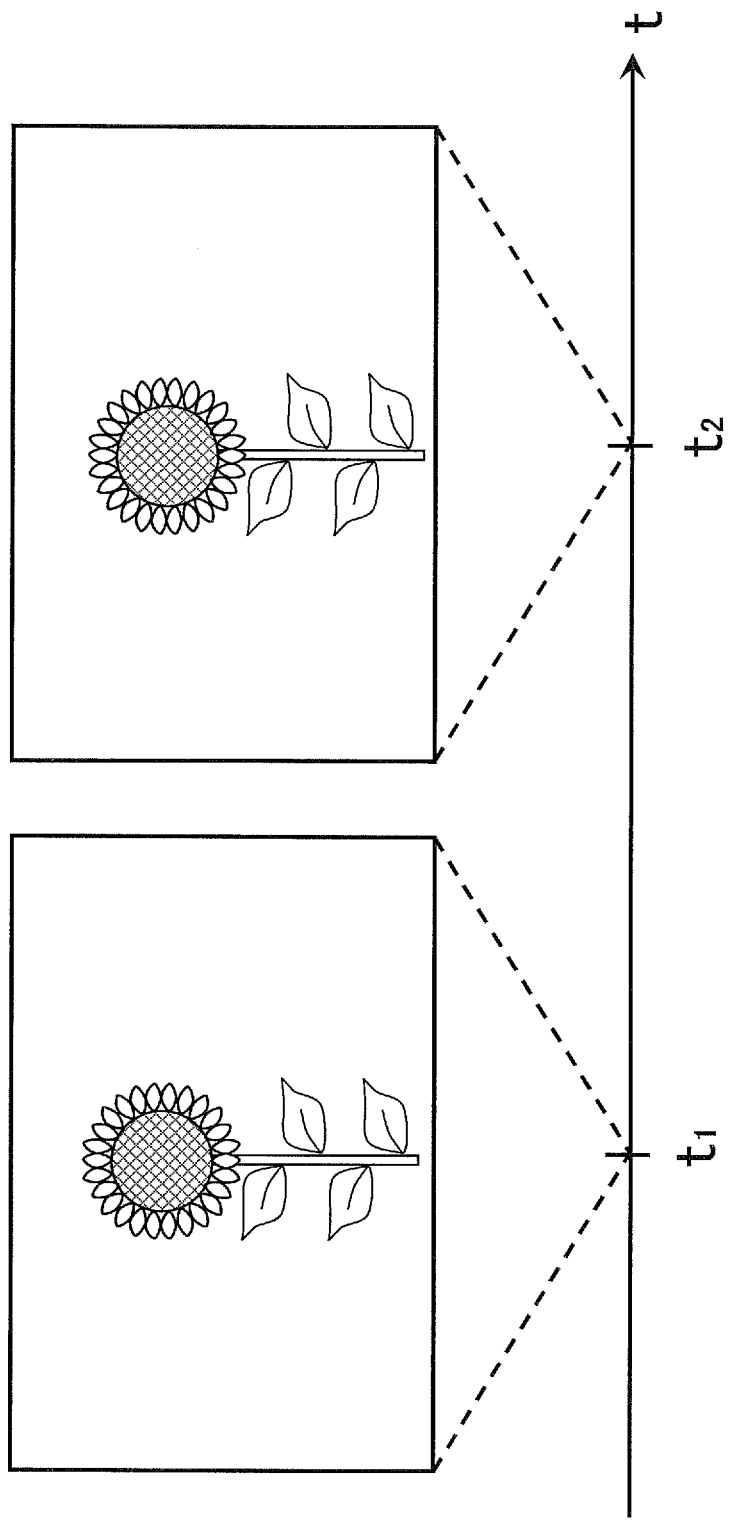
FIG. 2 is a schematic diagram illustrating three-dimensional NR that does not take into account the movement of the camera in Embodiment 1.

1-2. Operation 1-2-1. Three-Dimensional NR Not Taking Camera Movement into Account The three-dimensional NR performed by the image processor 190 is either three-dimensional NR that does not take movement of the camera into account, or three-dimensional NR that does take movement of the camera into account. First, we will describe three-dimensional NR that does not take movement of the camera into account, through reference to FIG. 2.

In three-dimensional NR, first the difference is found between images with different time stamps. For example, data obtained by subjecting the output of the CCD image sensor 180 to various processing is stored ahead of time by frame in the memory 200, and is read out one frame later. When an image is outputted from the CCD image sensor 180 at time t2, image data from one frame earlier, that is from the time t1, is outputted from the memory 200. Three-dimensional NR finds the difference in image data at times t2 and t1.

Figure 3:
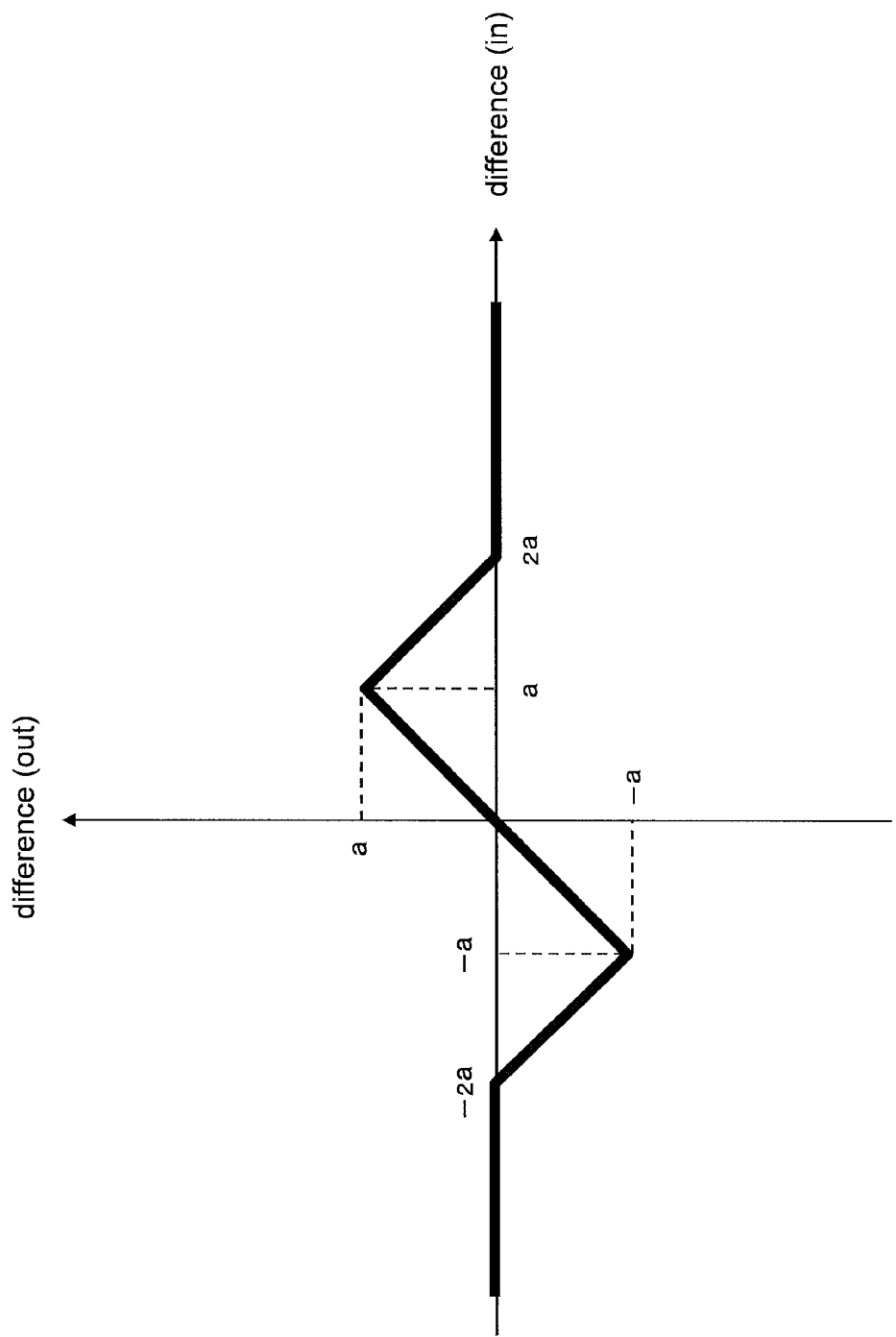
FIG. 3 is a schematic diagram illustrating three-dimensional NR that does not take into account the movement of the camera in Embodiment 1.

The above-mentioned difference includes both the noise content and the movement component. Here, the noise content is generally extracted from this difference by utilizing the fact that the amplitude is smaller with respect to the movement component. For example, after the difference has been found for image data at times t2 and t1, the nonlinear processing of characteristics shown in FIG. 3 is performed. This nonlinear processing results in the output of just the difference in amplitude of ±2a. Since this includes a large noise content as mentioned above, noise can be reduced by subtracting the output of this nonlinear processing from the image signal at time t2. However, not all of the output of this nonlinear processing is necessarily a noise content, and a movement component with a small amplitude, such as when the entire camera is slowly panned, is included, for example. In this case, if the small-amplitude content is considered to be noise and subtracted from the image signal at time t2, just the movement component will remain. Specifically, there will be an afterimage.

1-2-2. Three-Dimensional NR Taking Camera Movement into Account

Figure 4:
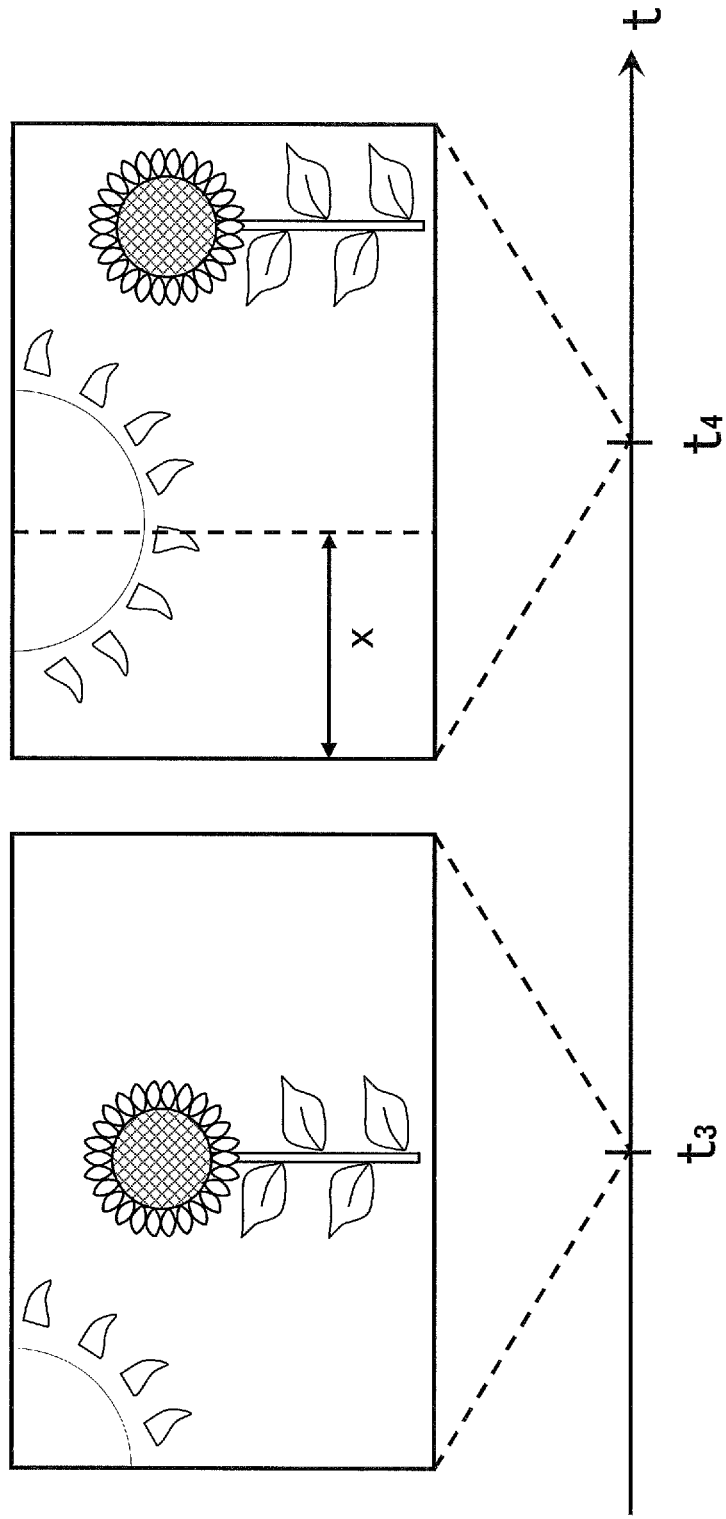
FIG. 4 is a schematic diagram illustrating three-dimensional NR that takes into account the movement of the camera in Embodiment 1.

Three-dimensional NR that takes movement of the camera into account will now be described through reference to FIGS. 4 and 5. If we assume that the camera has moved due to panning, etc., the image data outputted from the CCD image sensor 180 will vary in its angle of field with time, as shown in FIG. 4. In contrast, when three-dimensional NR that does not take the movement of the camera into account is performed, as discussed above, the difference in the image data at time t4 and time t3 from the memory 200 is found, and the small-amplitude content of this is considered to be noise, so a movement component with a small amplitude will appear as an afterimage as mentioned above. With three-dimensional NR that does take camera movement into account, afterimage is suppressed by performing a separate control as described below.

Figure 5:
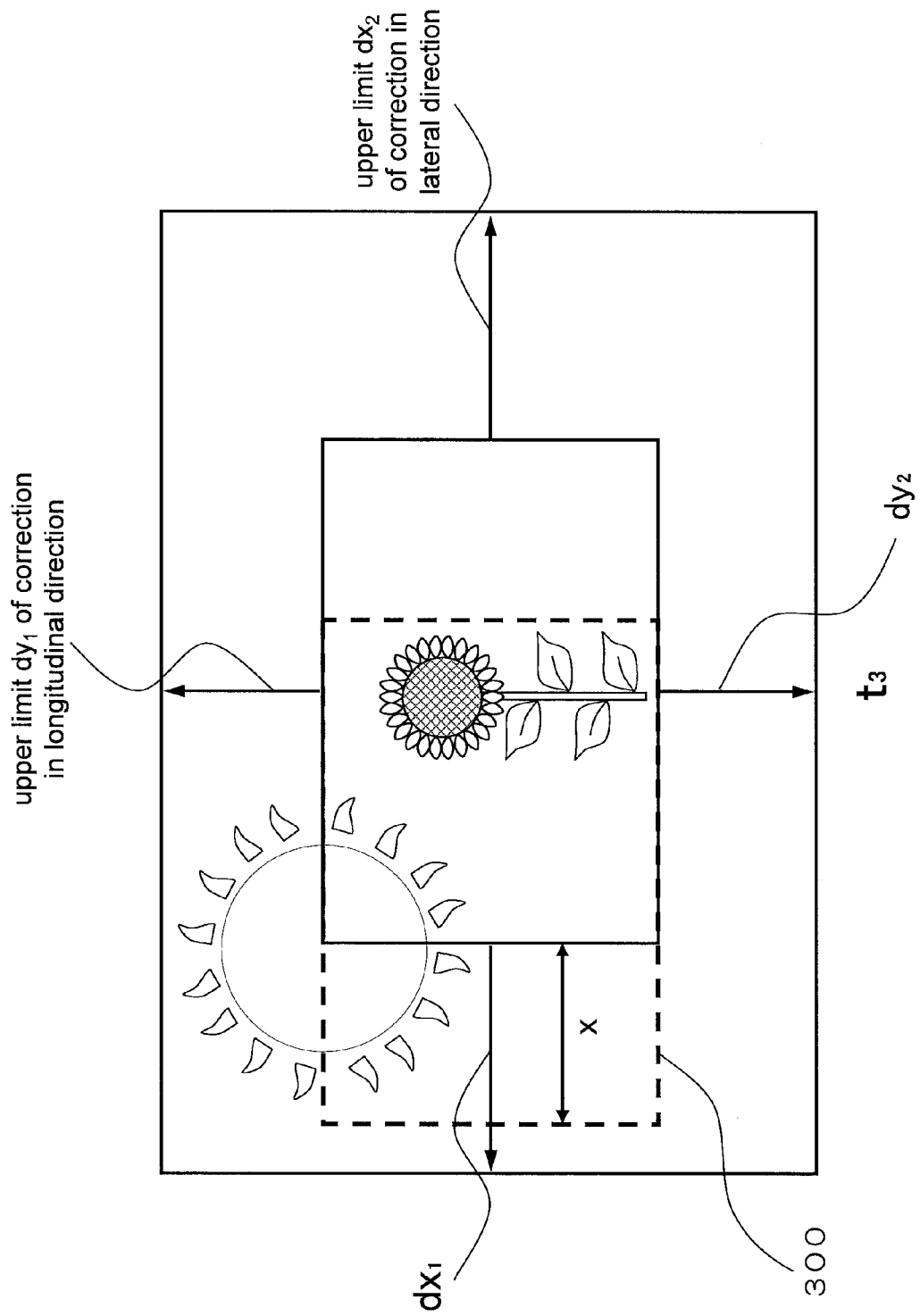
FIG. 5 is a schematic diagram illustrating three-dimensional NR that takes into account the movement of the camera in Embodiment 1.

FIG. 5 shows an image captured by the CCD image sensor 180. In general, the number of pixels of the CCD image sensor 180 is greater than what is required by the image format in final recording to the memory card 240. Therefore, once the output of the CCD image sensor 180 has been stored in the memory 200, the number of pixels required by the image format in recording to the memory card 240 are cropped out and read.

The controller 210 changes the range of this cropping by using the movement vector detected by the image processor 190 on the basis of the captured image. In the case of FIG. 4, the field angle changes as with the image data at times t3 and t4, and the image processor 190 detects a direction of the change, that is the right in the case of FIG. 4, and a movement amount x as the movement vector.

In cropping from the image data at the time t3 recorded to the memory 200, if the cropping range is changed by x in the left direction as indicated by the dotted line in FIG. 5, the field angle will coincide with the image data at the time t4. Therefore, if the difference is found in the image data at times t3 and t4 read after thus changing the cropping range, and if the small amplitude content is extracted by nonlinear processing as in FIG. 3, this component will include no camera movement component, and will include only a noise content. Therefore, if the output of the nonlinear processing is subtracted from the image data at the time t4, this reduces noise and yields image data with little afterimage.

Nevertheless, it is not always possible to change the cropping range by the detected movement vector amount. The difference is found between the cropping range at a given time and the total image data range captured by the CCD image sensor 180 and recorded to the memory 200 (for example, in FIG. 5, dx1 and dx2 are the upper limits of correction in the lateral direction, and dy1 and dy2 are the upper limits of correction in the longitudinal direction, and the cropping range can be changed within this range.

Also, when the image processor 190 performs electronic zoom processing, the cropping range from the memory 200 narrows according to the electronic zoom ratio. For instance, if the electronic zoom ratio is two times, the cropping range will be ½ in both the lateral and the longitudinal directions as compared to when the electronic zoom ratio is one time. Therefore, the more the electronic zoom ratio rises, the more the above-mentioned correction upper limits dx1, dx2, dy1, and dy2 increase.

1-2-3. Overall Control of NR

Figure 6:
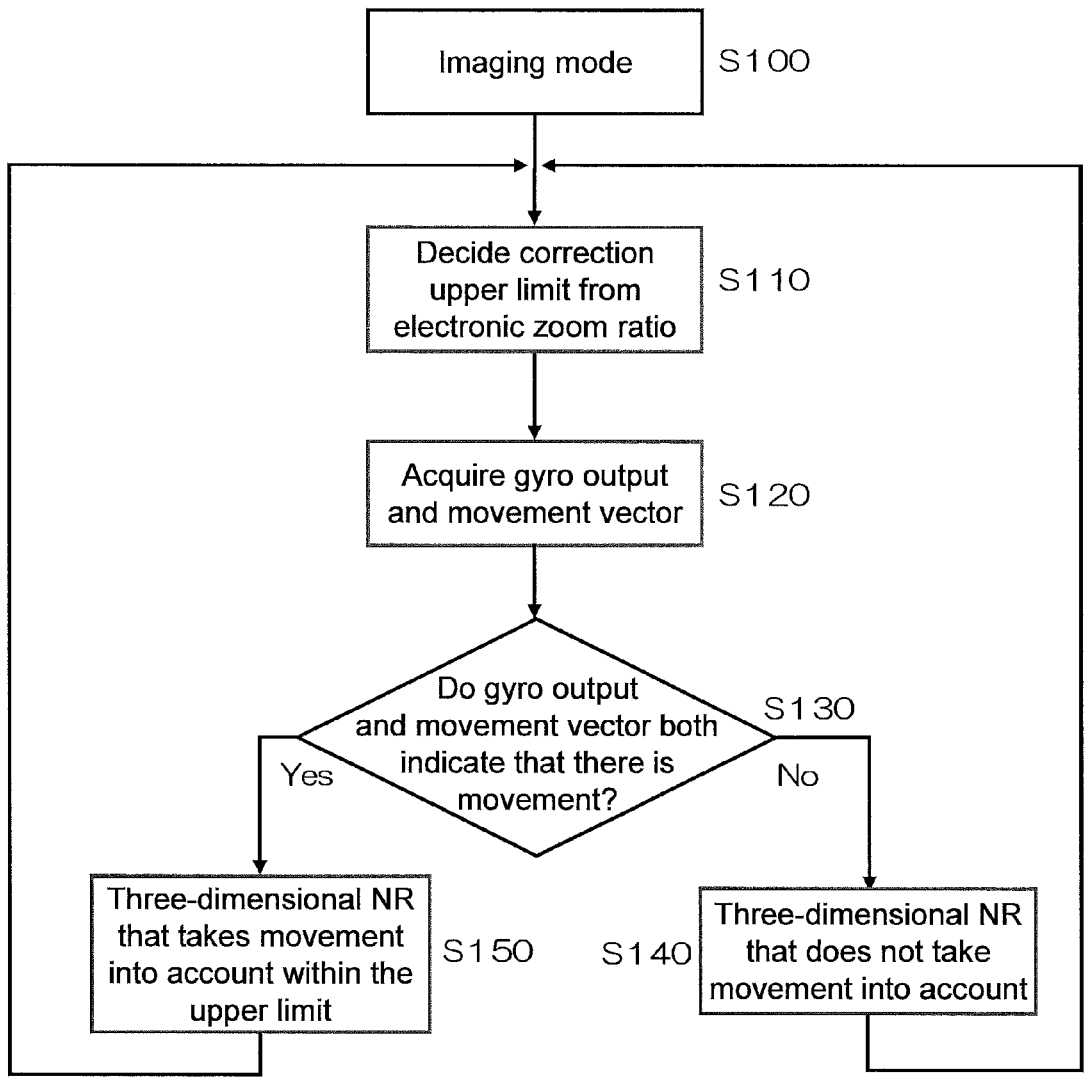
FIG. 6 is a flowchart illustrating the overall NR control in Embodiment 1.

The controller 210 controls whether to perform three-dimensional NR processing that does not take camera movement into account, or three-dimensional NR processing that does take camera movement into account. This control method will be described through reference to the flowchart in FIG. 6.

The user can set the digital video camera 100 to imaging mode by manipulating the manipulation member 250 (S100). When the imaging mode is set, the digital video camera 100 begins a series of operations such as the capture of an image and the attendant three-dimensional NR processing.

First, the controller 210 decides the above-mentioned correction upper limits dx1, dx2, dy1, and dy2 from the electronic zoom ratio set by the user with the zoom lever 260 (S110).

Next, the controller 210 acquires angular velocity information output from the gyro sensor 220, and the movement vector detected by the image processor 190 (S120).

It is concluded from the acquired gyro sensor output that there is movement of the camera, and it is determined whether or not the movement vector amount is at least a specific value (S130), and in that case, the controller 210 controls so that three-dimensional NR processing that takes movement into account is performed (S150). The amount of movement in the cropping range with respect to the memory 200 here is within the range up to the correction upper limits dx1, dx2, dy1, and dy2 decided on the basis of the electronic zoom ratio.

On the other hand, if this is not the case, the controller 210 performs three-dimensional NR processing that does not take movement into account (S140).

With the above control, if there actually was movement of the camera, such as when the user pans the camera, the output of the gyro sensor 220 indicates that there is camera movement, and the movement vector amount exhibits at least a specific value, so three-dimensional NR processing that takes movement into account is performed under the control flow described above. Therefore, noise is reduced while an image with little afterimage is obtained.

Next, if the movement vector amount is at least a specific value even though the camera is fixed on a tripod, etc., and does not move, it is thought that an object passes in front of the fixed camera, or the movement detection of the image processor 190 bungles because of a large amount of noise included in the output of the CCD image sensor 180.

In such a case, since there is zero angular velocity information from the gyro sensor 220, the controller 210 concludes that there is no camera movement, and performs three-dimensional NR processing that does not take movement into account. Therefore, the cropping range remains fixed, and this prevents malfunction in which an afterimage is caused by three-dimensional NR as a result of movement of the cropping range even though the camera is stationary.

It is also conceivable that the gyro sensor 220 will malfunction for some reason when the movement vector amount is below a specific value even tough the output of the gyro sensor 220 indicates that there is movement of the camera. Here again, the above-mentioned control will result in three-dimensional NR processing that does not take movement into account, so malfunction of the gyro sensor 220 can be prevented from affecting three-dimensional NR processing.

Finally, when the output of the gyro sensor 220 does not indicate movement, and the detected movement vector amount is below a specific value, here again the result will be three-dimensional NR processing that does not take movement into account, but in this case since the camera is actually stationary, no afterimage occurs even with three-dimensional NR processing that does not take movement into account. It should also go without saying that noise is reduced.

Embodiment 2

2-1. Overall Control of NR

Where Embodiment 2 differs from Embodiment 1 is that the correction upper limits dx1, dx2, dy1, and dy2 are not set, and this will be described through reference to FIGS. 7, 8, and 9. Otherwise, everything is the same as in Embodiment 1, and will not be described again.

Figure 7:
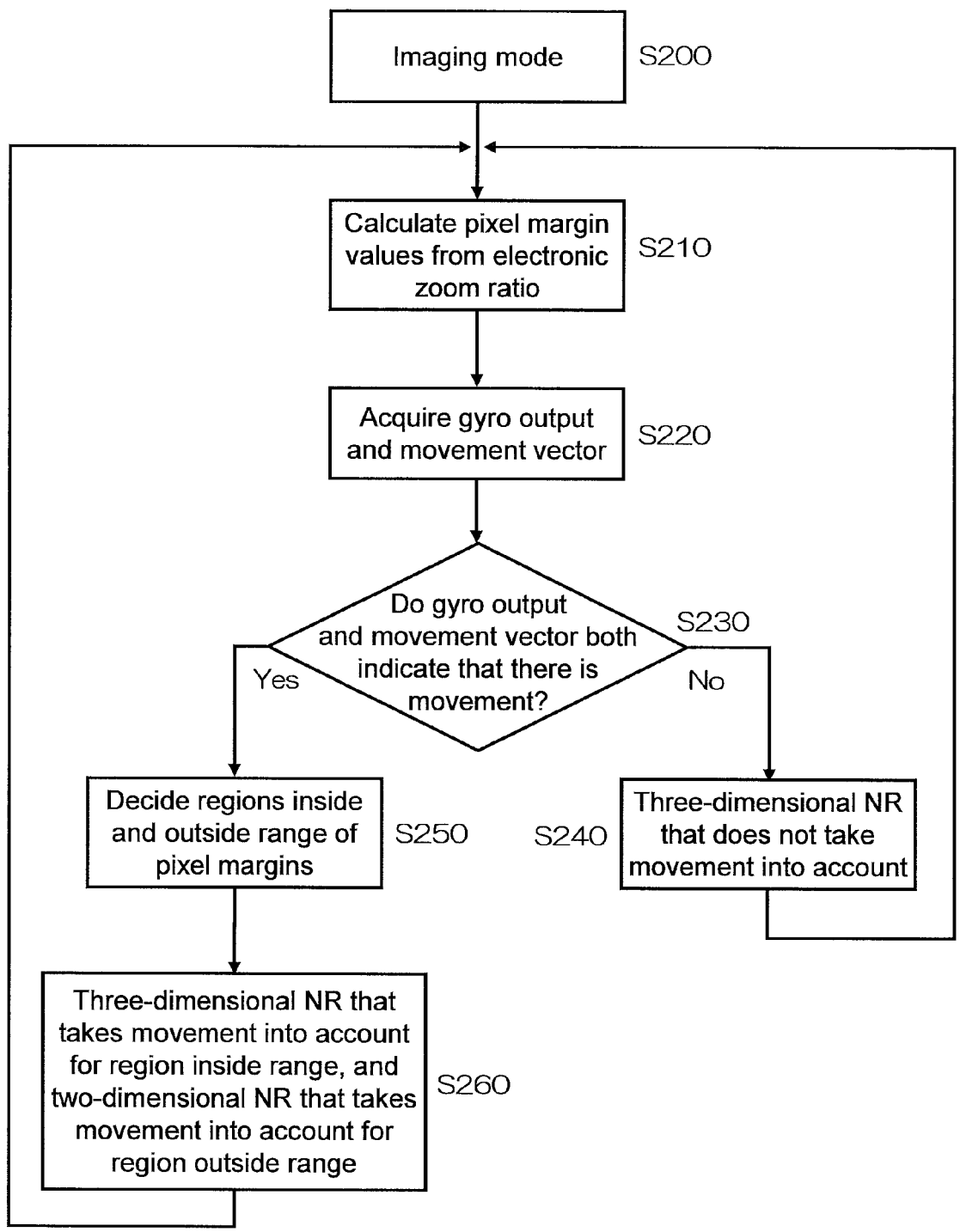
FIG. 7 is a flowchart illustrating the overall NR control in Embodiment 2.

FIG. 7 is a flowchart that shows a control method in Embodiment 2 in which it is decided whether the controller 210 will perform three-dimensional NR processing that takes movement into account, or three-dimensional NR processing that does not take movement into account.

If the user uses the manipulation member 250 to set the digital video camera 100 to imaging mode (S200), the zoom lens 110 begins a series of operations such as the capture of an image and the attendant three-dimensional NR processing.

The controller 210 calculates the above-mentioned correction upper limits dx1, dx2, dy1, and dy2 from the electronic zoom ratio set by the user with the zoom lever 260 (S210). However, while dx1, dx2, dy1, and dy2 express the upper limits of movement of the cropping range in Embodiment 1, in Embodiment 2 no movement upper limits are set. Therefore, dx1, dx2, dy1, and dy2 are defined merely as pixel margin values generated by cropping.

Next, just as in Embodiment 1, the controller 210 acquires angular velocity information output from the gyro sensor 220, and the movement vector detected by the image processor 190 (S220).

Figure 8:
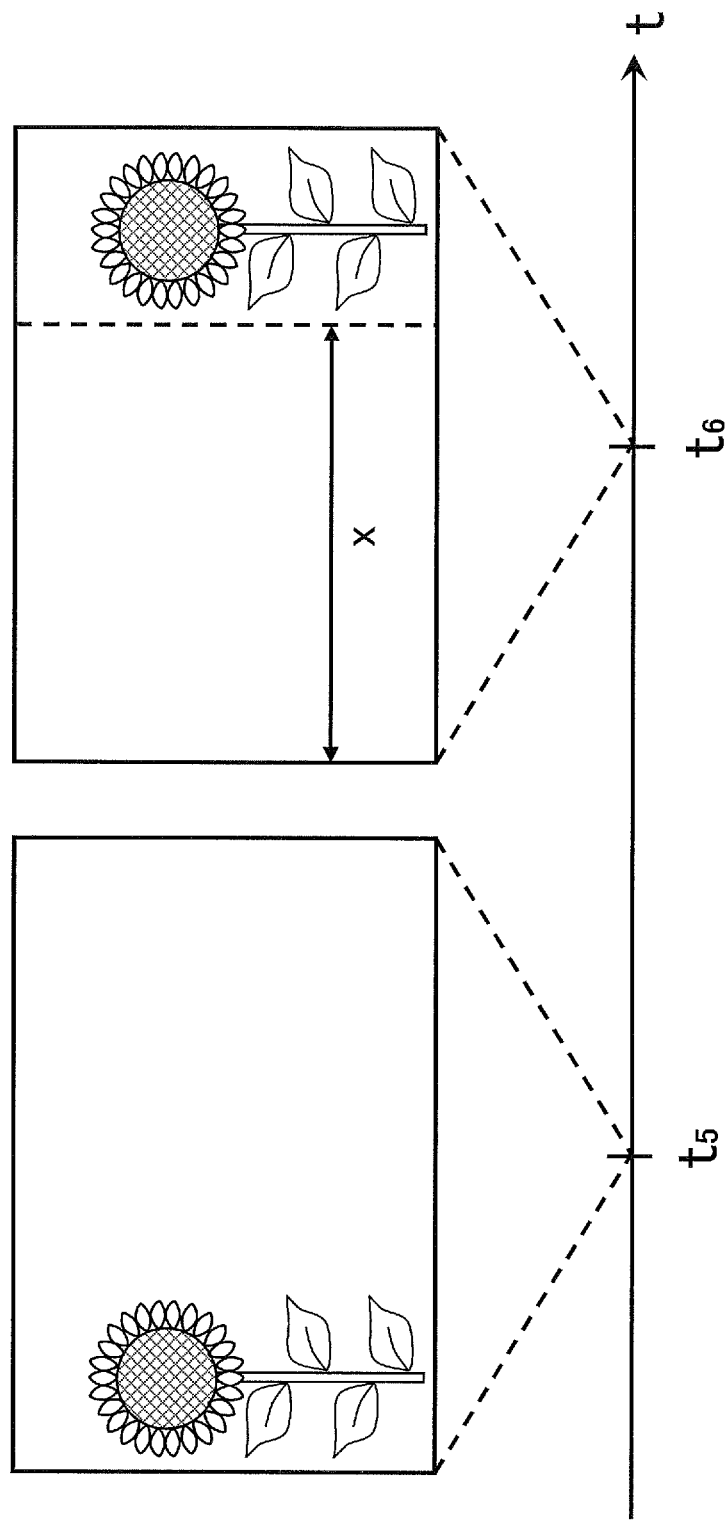
FIG. 8 is a schematic diagram illustrating NR in Embodiment 2.
Figure 9:
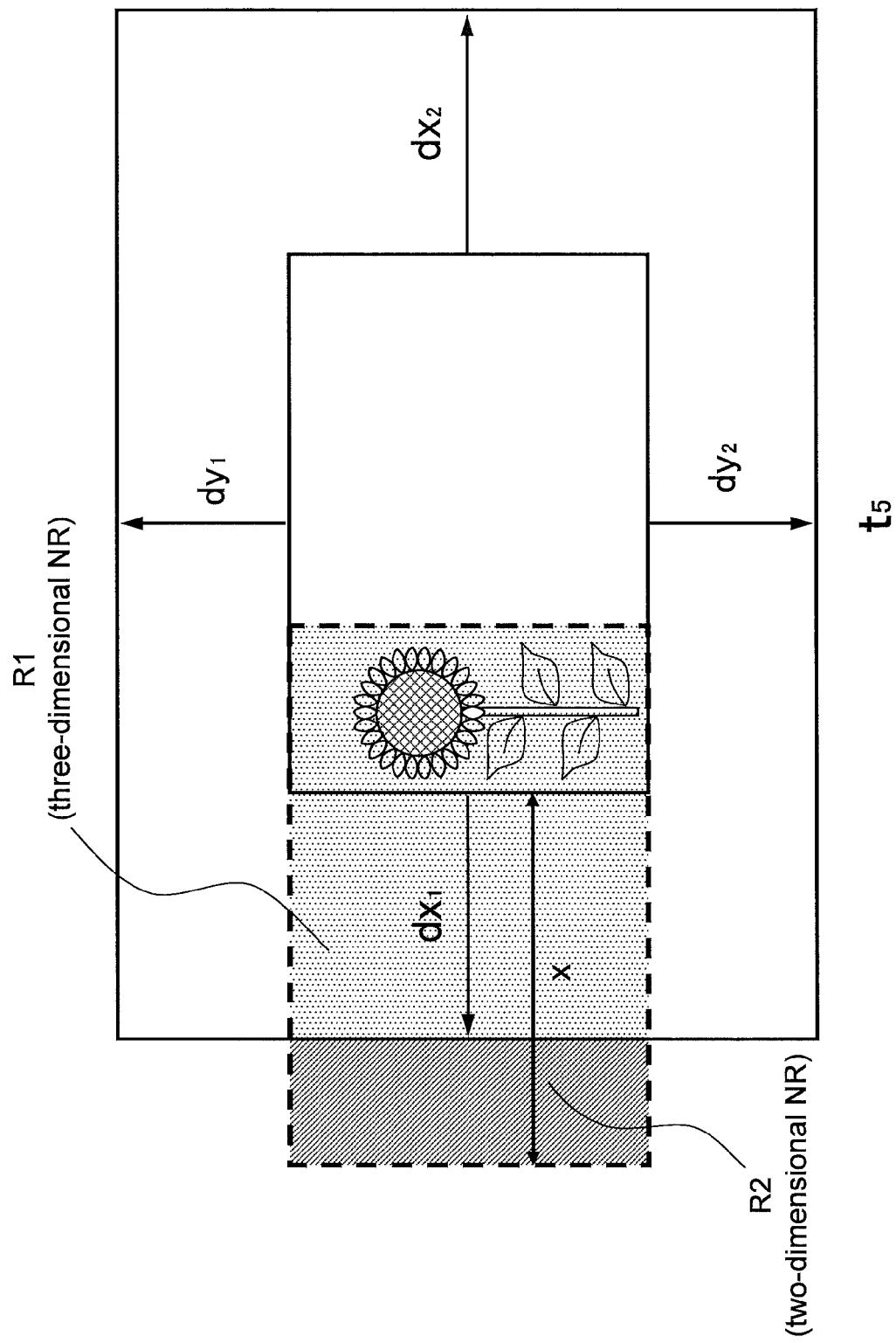
FIG. 9 is a schematic diagram illustrating NR in Embodiment 2.

Let us assume, for example, that the camera is moved in panning or the like, and the image data outputted from the CCD image sensor 180 is as shown in FIG. 8. In this case, the detected movement vector is a movement amount x to the right.

Next, it is concluded from the acquired gyro sensor output that there is movement of the camera, and it is determined whether or not the movement vector amount is at least a specific value (S230).

As a result, if the acquired gyro sensor output does not show that there is movement of the camera, or if the movement vector amount is less than a specific value, then just as in Embodiment 1 the controller 210 performs three-dimensional NR processing that does not take movement into account (S240).

As a result, if the acquired gyro sensor output shows that there is movement of the camera, and the movement vector amount is at least a specific value as in FIG. 8, then the controller 210 (an example of a "region setting component") first sets regions inside and outside the range of the pixel margin values decided in step S210 on the basis of the movement vector with respect to the image data that has undergone various image processing with respect to the output of the CCD image sensor 180 (S250). This region setting will be discussed in detail below.

In FIG. 8, when an image is outputted from the CCD image sensor 180 at the time t6, the image data at the time t5 is stored in the memory 200. FIG. 9 shows the image data at the time t5 stored in the memory 200. dx1, dx2, dy1, and dy2 are the above-mentioned pixel margin values.

If the cropping range is moved by x to the left (as indicated by the dotted line) on the basis of the detected movement vector, there is a division into a first region R1 in which pixels are present in the memory, and a second region R2 in which pixels are not present. In view of this, a region corresponding to the first region R1 and a region corresponding to the second region R2 are set for the image data of the CCD image sensor 180 at the time t6.

The image processor 190 subjects the first region R1 to three-dimensional NR processing that takes movement into account, using the image data read from the memory 200, just as in Embodiment 1, and subjects the second region R2 to two-dimensional NR processing without using the image data from the memory 200 (S260).

With the NR overall control discussed above, even if there is little pixel margin, if three-dimensional NR processing that takes movement into account is performed, there will be little afterimage and the resulting image will have reduced noise. Meanwhile, again with the second region R2, since two-dimensional NR processing is performed instead of three-dimensional NR processing, a noise reduction effect is obtained.

Other Embodiments

Embodiments 1 and 2 were described above as embodiments of the present invention, but the present invention is not limited to or by these. Therefore, other embodiments of the present invention will be described in this section.

The optical system and drive system of the digital video camera 100 pertaining to this embodiment are not limited to what is shown in FIG. 1. For example, FIG. 1 shows an example of an optical system with a three-group configuration, but the lens configuration may have some other group configuration. Also, each of the lenses may be constituted by a single lens, or may be a lens group made up of a plurality of lenses.

Also, in Embodiment 1, the CCD image sensor 180 was given as an example of an imaging component, but the present invention is not limited to this. For example, the imaging component may be constituted by a CMOS image sensor or an NMOS image sensor.

Also, in Embodiment 2, the first region R1 in which pixels were present in the memory was subjected to three-dimensional NR, while the second region R2 in which pixels were not present was subjected to two-dimensional NR, but this is not the only option. For example, out of the first region R1, a specific range that is near the second region R2 may be subjected to both three-dimensional NR and two-dimensional NR, with the ratio thereof being such that the proportion of two-dimensional NR is higher nearer the second region R2, and the proportion of three-dimensional NR is higher farther away. This gives the effect of blurring the boundary between three-dimensional NR and two-dimensional NR.

Also, in Embodiments 1 and 2, two-dimensional NR processing was performed on the basis of the spatial frequency of the image data, but this is not the only option, and NR processing may be performed using just the image data for a given time.

Also, in Embodiments 1 and 2, in the three-dimensional NR processing, the characteristics of nonlinear processing with respect to the difference in image data at different times were as shown in FIG. 3, but it should go without saying that this is not the only option.

Also, in Embodiment 2, whether or not the camera was moving was concluded from the output of the gyro sensor, but this is not the only option. More specifically, in step S230 in FIG. 7, just whether or not the movement vector amount is at least a specific value may be determined.

Industrial Applicability

The present invention can be applied to a digital video camera, a digital still camera, or another such imaging device.

What is claimed is:

1. An imaging device, comprising: a movement detection component configured to detect movement of the imaging device by detecting force imparted to the imaging device, and to produce a movement detection result; an imaging component configured to produce image data by capturing a subject image, the image data including a first image data and a second image data, the first image data including a noise, and the second image data produced before the first set of image data; a movement vector detection component configured to detect a movement vector based on at least the produced plurality of sets of image data, and to output a vector detection result; and a three-dimensional noise reduction (NR) component configured to select a correction method from a plurality of correction methods, the plurality of correction methods being non-blur correction methods, the selecting based on the movement detection result and the vector detection result; wherein the three-dimensional NR component is further configured to correct the first image data using the selected correction method, when the movement detection result indicates that the imaging device is moving, and the vector detection result indicates that the movement vector is greater than or equal to a threshold value, the three-dimensional NR component is further configured to select a correction method from the plurality of correction methods that incorporates the vector detection result, when either the movement detection result indicates that the imaging device is still or when the vector detection result indicates that the movement vector is less than the threshold value, the three-dimensional NR component selects a correction method from the plurality of correction methods that does not incorporate the vector movement result; the imaging device further comprising: an electronic zoom component configured to change a zoom ratio by changing a cropping range for image data produced by the imaging component, and the three-dimensional NR component configured to change an upper limit of a correction amount of the first image data on the basis of the zoom ratio of the electronic zoom component, and the three-dimensional NR component configured to correct the first image data in response to the detection result of the movement vector detection component.

2. The imaging device according to claim 1, wherein:
the three-dimensional NR is further configured to correct the first image data using the selected correction method, the selecting dependent upon the detection result of the movement vector detection component.

3. The imaging device according to claim 1, wherein:
the three-dimensional NR component is configured to select a correction method that does not incorporate correcting the first image data in response to the detection result of the movement vector detection component when either the movement detection result indicates that the imaging device is not moving, or the vector detection result is less than a threshold value.

4. The imaging device according to claim 1, further comprising:
a two-dimensional NR component configured to reduce the noise included in the first image data in response to information contained in the first image data;
a region setting component configured to set:
    a first region in the image data produced by the imaging component, in which the noise is reduced by the three-dimensional NR component; and
    a second region in the image data produced by the imaging component, in which the noise is reduced by the two-dimensional NR component; and
a control component configured to control the region setting component to set the first region and the second region, on the basis of the detection result of the movement vector detection component 5. The imaging device according to claim 4, wherein:
the region setting component is further configured to further set a third region in which the noise is reduced by both the two-dimensional NR component and the three-dimensional NR component, and
the control component is further configured to control the region setting component to set the first region and the second region and the third region, based on the detection result of the movement vector detection component.

6. The imaging device according to claim 1, wherein:
the three-dimensional NR component is further configured to calculate a difference between the first image data and the second image data, and to reduce a noise included in the first image data using the difference between the first image data and the second image data.

* * * * *